(12) United States Patent
Cleaveland et al.

(10) Patent No.: US 7,644,398 B2
(45) Date of Patent: Jan. 5, 2010

(54) SYSTEM AND METHOD FOR AUTOMATIC TEST-CASE GENERATION FOR SOFTWARE

(75) Inventors: Rance Cleaveland, N. Arlington, VA (US); Steve T. Sims, N. Arlington, VA (US); David Hansel, Brookline, MA (US)

(73) Assignee: Reactive Systems, Inc., Cary, NC (US)

( * ) Notice: Subject to any disclaimer, the term of this patent is extended or adjusted under 35 U.S.C. 154(b) by 604 days.

(21) Appl. No.: 10/499,583

(22) PCT Filed: Dec. 19, 2002

(86) PCT No.: PCT/US02/40590

§ 371 (c)(1),
(2), (4) Date: Feb. 18, 2005

(87) PCT Pub. No.: WO03/054666

PCT Pub. Date: Jul. 3, 2003

(65) Prior Publication Data

US 2005/0160321 A1     Jul. 21, 2005

Related U.S. Application Data

(60) Provisional application No. 60/341,112, filed on Dec. 19, 2001.

(51) Int. Cl.
*G06F 9/44* (2006.01)
*G01R 31/28* (2006.01)
*G06F 17/50* (2006.01)

(52) U.S. Cl. ............... 717/135; 717/124; 714/741; 716/4; 703/14; 703/16

(58) Field of Classification Search ............... None
See application file for complete search history.

(56) References Cited

U.S. PATENT DOCUMENTS

| 6,173,440 | B1 * | 1/2001 | Darty | 717/130 |
| 6,182,258 | B1 * | 1/2001 | Hollander | 714/739 |
| 6,654,715 | B1 * | 11/2003 | Iwashita | 703/22 |
| 7,299,382 | B2 * | 11/2007 | Jorapur | 714/38 |

OTHER PUBLICATIONS

Hong et al., "Automatic Test Generation from Statecharts Using Model Checking", Jan. 1, 2001, University of Pennsylvania, pp. 1-27.*
Fröhlich et al., "Automated Test Case Generation from Dynamic Model", 2000, Springer-Verlag Berlin Heidelberg, pp. 472-491.*
Arditi et al., "Coverage Directed Generation of System-Level Test Cases for the Validation of a DSP System", Jan. 2, 2001, Springer-Verlag Berlin Heidelberg, pp. 449-464.*

(Continued)

*Primary Examiner*—Michael J. Yigdall
*Assistant Examiner*—Ben C Wang
(74) *Attorney, Agent, or Firm*—Coats & Bennett, P.L.L.C.

(57) ABSTRACT

A method for generating test cases for software and a test case generator comprising a simulator that drives software under test from one input state to the next. The simulator is constrained by predetermined criteria to visit states that meet the criteria thus preserving computer resources. The states reached by the simulator are tested.

11 Claims, 6 Drawing Sheets

OTHER PUBLICATIONS

K. Preston White Jr., "Modeling and Simulation", Dec. 27, 1999, John Wiley & Sons, Inc., pp. 1-14.*

Graf et al., "Tools and Algorithms for the Construction and Analysis of Systems", Springer-Verlag Berlin Heidelberg, TACAS 2000, Mar. 25, 2000, pp. 1-13.*

Bharadwaj et al., "Salsa: Combining Constraint Solvers with BDDs for Automatic Invariant Checking", Mar. 25, 2000, TACAS 2000, Berlin, Germany, pp. 1-16.*

* cited by examiner

_US 7,644,398 B2_

SYSTEM AND METHOD FOR AUTOMATIC TEST-CASE GENERATION FOR SOFTWARE

CROSS REFERENCE TO RELATED APPLICATION

This application claims the benefit of U.S. Provisional Patent Application No. 60/341,112, entitled "Automatic Test-Case Generation for Software Using Guided Simulation," filed Dec. 19, 2001, the disclosure of which is expressly incorporated herein by reference in its entirety.

FIELD OF INVENTION

This invention relates to software testing, specifically to the process of seeking assurance that a computer program operates as intended.

BACKGROUND OF THE INVENTION

Correct and reliable operation of software is of paramount importance in today's society, where applications ranging from cardiac pacemakers to automobiles to airplanes to missiles rely on software-driven embedded controllers. For example, a typical late-model automobile contains some two dozen microprocessors, each running its own piece of software, that control everything from braking and transmission systems to passenger-compartment climate. By 2005, it is projected that 40% of the cost of an automobile will be electronics-related, with most of this cost devoted to the development and maintenance of software running on the embedded microprocessors.

One of the main techniques used by software developers to validate the correctness of their applications is testing. To test a piece of software a developer devises inputs to be fed into the software under test (SUT), runs the SUT on the inputs, and then checks that the resulting outputs conform to expectations. Testing forms a major component of the software-development process, often consuming 50% or more of the total budget for a software-development project.

Testing is usually undertaken on programs written in programming languages such as C, but increasingly it is also being applied to higher-level software artifacts such as models given in diagrammatic notations such as UML or the SIMULINK/STATEFLOW modeling languages for dynamical systems and embedded software. Developers test these models for the same reasons they test source code: to validate model behavior. Increasingly, developers also generate test cases from models and then apply them to the source code implementing the models. A benefit of this approach, often referred to as model-based testing, is that outputs generated by models and source code can be compared in order to verify that a program conforms to the model it implements.

Ideally, a developer would like to test a piece of software (model or source code) exhaustively by analyzing its behavior with respect to all possible inputs and under all possible input states. A state of a piece of software is an assignment of values to all variables, including the program counter, which indicates the next part of the software to be executed. An input state is a state in which the next operation to be executed reads one or more inputs. A program will remain in an input state until the required inputs are provided, whether by the user or by I/O devices with which the software interacts. Of course in some instances or an "input" or "another input" is also an output as referred to herein. In practice, exhaustive testing is usually not feasible due to the overwhelmingly large number of distinct inputs a system may respond to, as well as to the large number of distinct input states a system can be in. These phenomena are collectively known as state explosion.

To cope with the state explosion inherent in exhaustive testing, engineers use coverage criteria to control how much testing is performed. Coverage criteria are usually given as measures on the syntactic structure of the SUT by identifying a class of constructs that should be "exercised" by tests. Example criteria include the following.

Decision coverage: guarantees that all branches of all conditional (if-then-else) constructs in the software are executed.

Statement coverage: guarantees that all constructs are executed at least once.

Condition coverage: guarantees that all conditions (i.e., atomic predicates such as x==0) appearing in the program are evaluated to both true and false.

In general, coverage criteria are used to ensure that software is tested under a sufficient range of possible input values so that all "interesting" flows of control through a program are exercised.

The test-case generation problem for software is the following: given an SUT and a set of coverage criteria, construct a suite of test cases that maximizes the level of coverage obtained for the given coverage criteria.

The invention described herein, offers a novel approach to automatic test-case generation. The invention utilizes a simulator to drive the SUT from one input state to another, and constrains the simulator to visit those states that are most likely to have the largest positive impact on the coverage criterion. It also uses sophisticated data structures to eliminate redundancy in tests. Utilizing the invention will significantly streamline the testing process, which often consumes a minimum of 40% of a software project's overall budget.

The prior art for automatic test-case generation for software and models of software falls under two broad categories: single-step techniques and multi-step techniques.

Single-step techniques produce what are usually called. Each such vector is an assignment of values to the input variables of the software (one value per variable). A test suite in this case is a set of test vectors. The idea behind the test-vector approach is that, provided the developers have "driven" the SUT into a relevant input state, the inputs prescribed by the test vector can be applied to ensure the coverage of another element, or target, in the coverage criterion. For example, consider the condition-coverage criterion. A relevant test vector would force a particular condition of a particular conditional statement to be true or false if the software has first been placed in an input state guaranteeing that the conditional statement will be executed and the relevant condition evaluated. This general class of techniques is referred to as single-step techniques for automatic test-case generation since a test vector is capable of driving only a single step of program execution, and these techniques assume that the input state of the SUT has been appropriately manipulated before a test vector is applied.

The single-step approach is typified by the T-VEC test-case generation tool T-VEC accepts a set of "test specifications" as input and, using a test-selection strategy derived from the concept of domain testing theory, produces as output two test vectors for each test specification. The generated test values reflect how the test generator systematically selects low-bound and high-bound test points at the domain boundaries.

Multi-step techniques generate sequences of test vectors, as opposed to single test vectors, that drive the SUT from one input state to another, starting from the initial input state. This form of test generation is sometimes referred to as path-based testing.

The simplest approach to multi-step test generation is random simulation wherein a random simulation of the SUT is performed in such a way that when an input state is reached, random values are generated for the input variables. The set of test vectors generated in this fashion often creates a "scattergun" effect, where the most critical areas of the design receive no more testing than less critical areas of the design.

Capture/Replay is a multi-step technique that provides a simple mechanism to create automated tests to exercise the active elements of a graphical user interface (GUI) or web site. It allows the user to capture interactions with the application server that can subsequently be replayed to ensure that both the web elements and associated back-end processes are functioning as intended.

Another class of multi-step techniques is model-checker guided. A model checker is a verification tool that, given a specification of a system and a logical property of the system, determines if said property holds of said system. If not, a counter-example, in the form of an execution trace from the system's initial state to the state where the property is violated, is produced. Model-checker guided techniques found in the prior art supply a model checker with "negative requirements", that is, properties that are satisfied when found to be inconsistent. The model checker checks the requirements against the system specification. If such a requirement can be satisfied, it is found to be inconsistent, and the model checker generates a counter-example which is essentially a test that satisfies the requirement.

For programs whose input state never changes, the single-step, test-vector approach is useful. Traditional batch programs, which read inputs, compute, write outputs and then terminate, fall into this category. Interactive programs, however, including embedded applications as well as graphical user interfaces and transaction-processing routines, do not satisfy this property, as the state a program is in while awaiting inputs will depend at least in part on the preceding inputs it has read. For such applications the single-step, test-vector approaches are of little use, since they require the user to first ensure that the SUT is in an appropriate input state before feeding in a generated test vector.

The present invention relieves the developer of the burden of having to manually manipulate the state of the SUT before a test vector can be applied. This is accomplished by generating a suite of test sequences rather than test vectors. A test sequence is a sequence of test vectors that automatically drive the SUT from one input state to another, starting with the initial input state. The idea is that one test sequence can play the role of many test vectors (in terms of satisfying coverage criteria) without the need for manual manipulation of the SUT by the developer.

Random simulation often creates a "scattergun" effect, where the most critical areas of the design receive no more testing than less critical areas of the design. The input vectors in the test suites produced by the present invention are generated in an automated fashion. Capture/Replay, methods capture, and subsequently replay, user interactions with a GUI or web site. Therefore the user is responsible for choosing the inputs.

Because of the state-explosion problem, model-checker guided techniques work predominantly for the smallest of programs. The present invention Guided Simulation does not seek to exhaustively analyze the state space of a piece of software but rather constrains simulation in such a way that very high levels of target coverage are attained even for complex industrial models of software.

SUMMARY OF THE INVENTION

The invention disclosed herein is a novel approach to automatic test-case generation for software and models of software. The invention is a novel multi-step technique generating sequences of test vectors. The invention utilizes a simulator to drive the SUT from one input state to another, beginning in the initial input state. The term simulator is used to refer to a system tool that permits the step-by-step execution of a piece of software. In the software-modeling community, such a tool is called a simulator; in the programming community, such functionality is usually found in debuggers. In each step of simulation, input data generated by the invention is fed into the SUT, which may execute several constructs in the SUT until either the SUT terminates or another input state is reached. In the course of this single simulation step, which consists of a sequence of execution steps, the SUT may produce outputs. As these execution steps are performed, the invention tracks which coverage targets are covered and updates the percentage of covered targets accordingly. A coverage target (or simply "target") is one of the elements of interest to a given coverage criterion: statements, in statement coverage; branches, in decision coverage; etc. The method also records the sequence of test vectors generated during a simulation run and uses these to construct the suite of test sequences the method produces upon completion. Encountering 100% of the coverage targets corresponds to complete coverage under the given coverage criterion.

Prior art methods analyze the syntax of the SUT in order to generate their test vectors; the coverage of targets by this data is predicated on the SUT being advanced into an appropriate state by means external to such methods. In contrast, the disclosed invention produces sequences of inputs that, when executed from the initial state of the software, guarantee the actual run-time coverage of targets; no "method-external" execution of the system into appropriate states is necessary.

The invention also constrains the simulator to visit those reachable states of the SUT that are most likely to have the largest positive impact on the desired coverage criterion.

Since it uses a simulator to drive the software from one state to another, and constrains the simulator to visit those states that are most likely to have the largest positive impact on the coverage criterion, the disclosed method for automatic test-case generation is referred to as Guided Simulation.

DETAILED DESCRIPTION OF DRAWINGS

Figure 1:
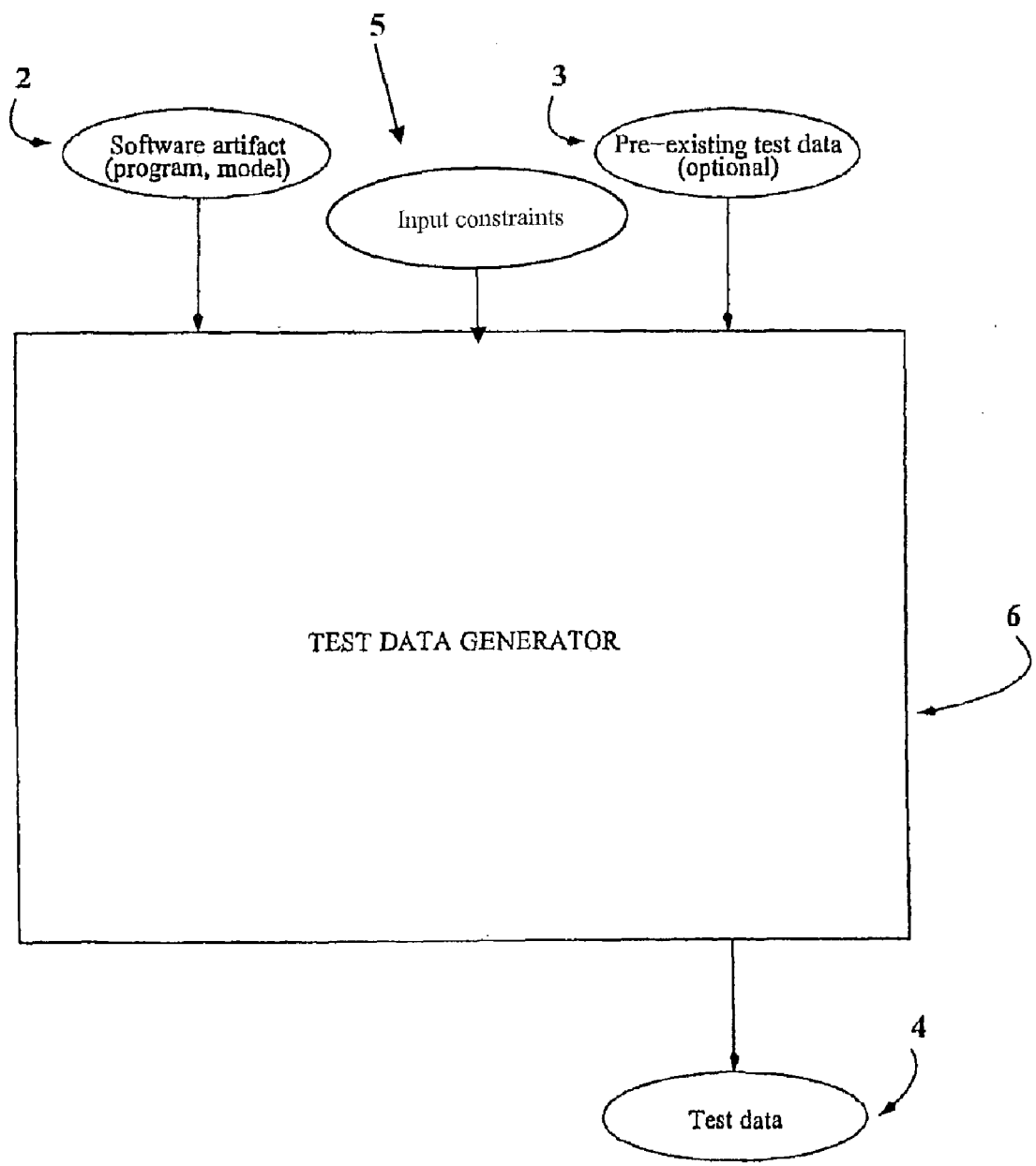
FIG. 1 is a top level overview of operation of the invention.

FIG. 1 depicts the operation of the invention from the perspective of a user of the invention. The user provides a software artifact in the form of a piece of source code or an executable model of a piece of software 2, together optionally with a file containing constraints on input values 5 and a of file previously constructed test data 3. The constraints on the input values are conditions that allowed input value must satisfy to be considered an appropriate input. These include, but are not limited to enumerations and ranges. An enumeration constraint restricts an input to be one value from a set of values. A range constraint restricts an input to fall within a particular range. A range constraint signifies one or more values within a set of values are one appropriate inputs. The invention then produces a file containing new test data 4.

Figure 2:
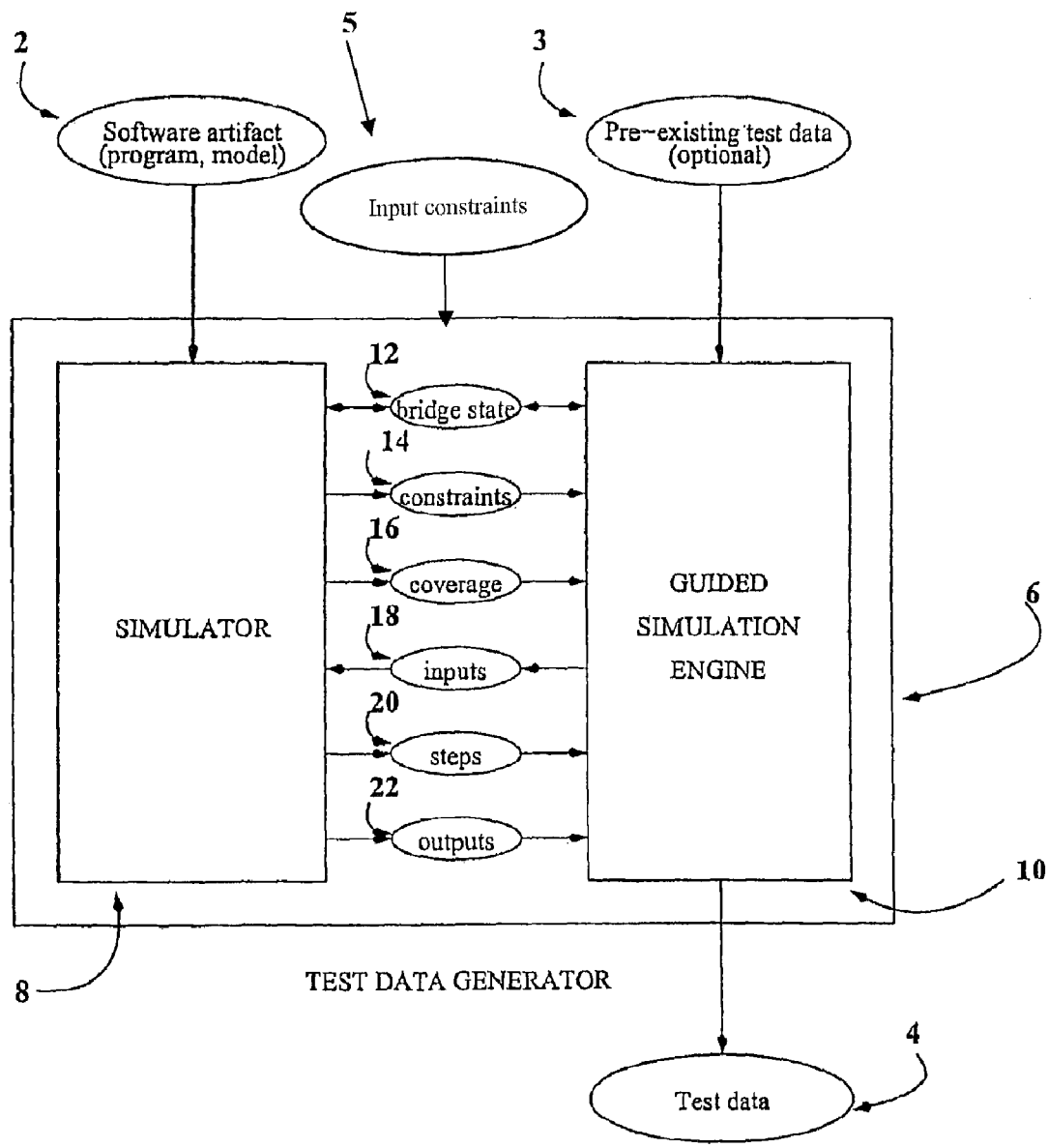
FIG. 2 is a block diagram of major components of the invention.
Figure 4:
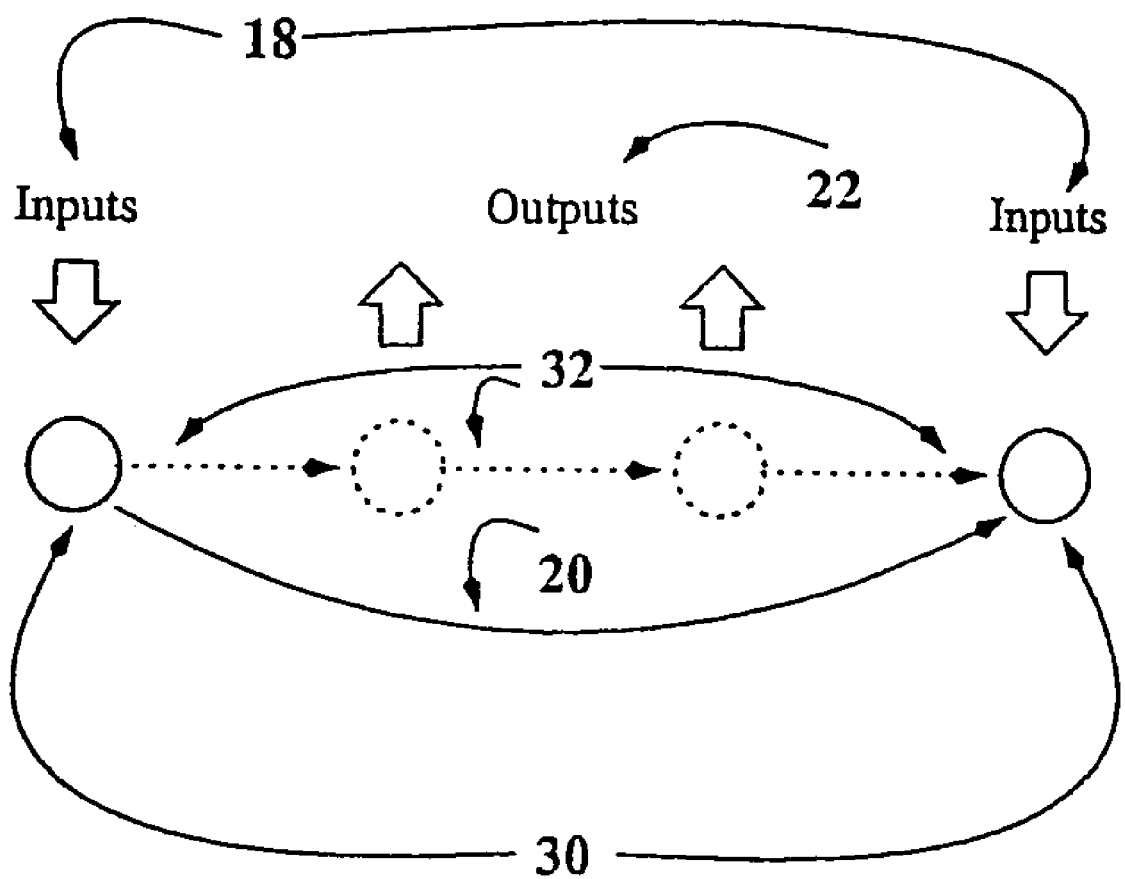
FIG. 4 depicts an example of a simulation step beginning and ending in an input state.

FIG. 2 contains a block diagram and associated information flow between some key components in the invention, The simulator 8 is responsible for executing simulation steps 20 for the Software-Under-Test (SUT) out of the basic execution steps 32 upon being given inputs (see FIG. 4); for storing input states 30 in the SUT in a data structure; for restarting simulation in a previously recorded input state contained in such a data structure (see FIG. 4); for tracking and recording information (16) regarding coverage targets that have been covered in the SUT; for maintaining a current set of bridge states 12; for processing and storing user-provided input constraints 5; for computing outputs the SUT generates in response to a given set of inputs 22; for computing sets of "interesting values" for inputs based on the structure of the SUT, as referred to below; and for constructing constraints 14 over inputs for a given bridge state that, if satisfied, will cause a new coverage target to be covered. A bridge state is a state that is a reasonable number of simulation steps away from covering an uncovered target.

Figure 5:
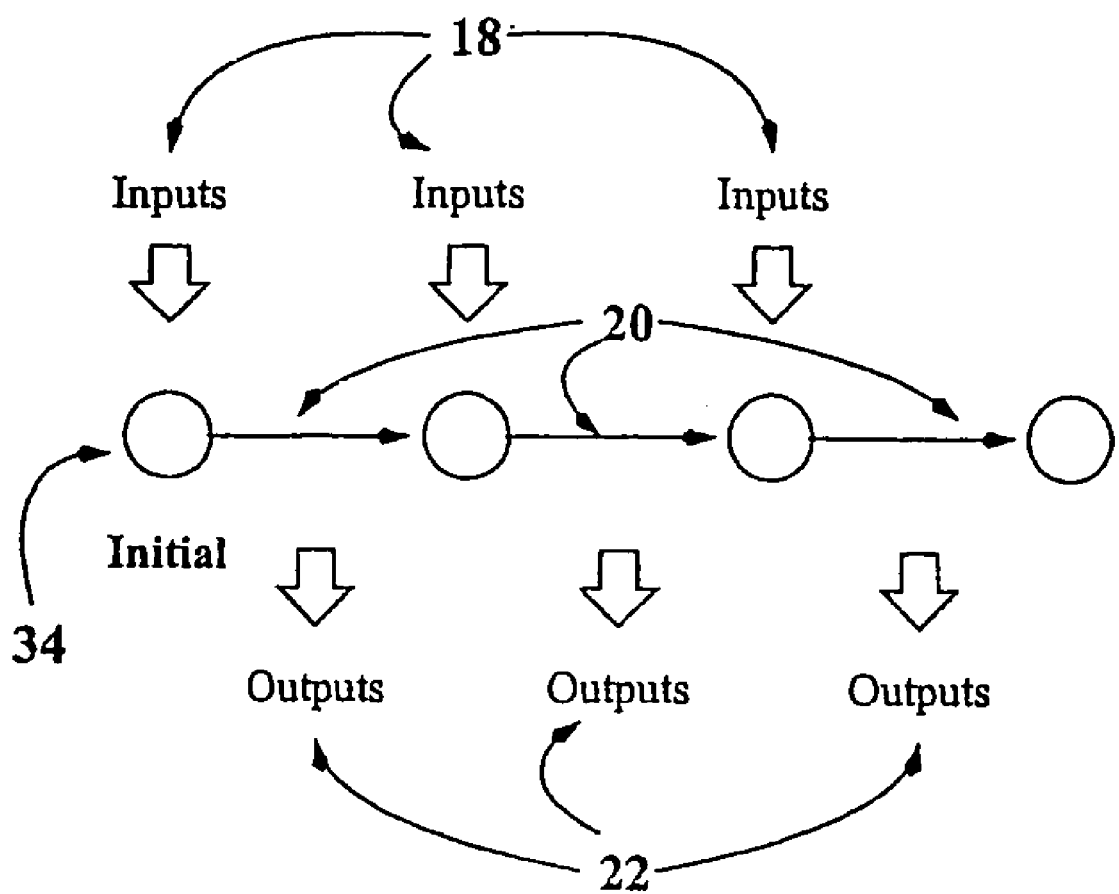
FIG. 5 depicts an example of a test sequence containing three simulation steps.

The Guided Simulation engine 10 is responsible for constructing a set of tests, each consisting of a sequence of input/output pairs generated by the SUT (see FIG. 5) with the following property: when the sequence of inputs 18 is applied to the SUT, starting from the SUT's initial state 34, the outputs produced by the SUT 22 are required to match those stored in the test. Preferably, the tests should maximize the number of coverage targets in the SUT that are covered.

Operationally, the invention consists first of an initialization procedure undertaken by the Simulator, followed by the test-data generation procedure implemented by a Guided Simulation Engine.

During the initialization procedure the Simulator 8 reads in the software artifact 2, constructs internal data structures for storing the current (initial 34) state of the SUT, and initializes the counters used to track coverage information 16. It also assembles data-type information and constraints 14 for the SUT's inputs. This information about inputs is constructed in the following automated method:

1. Data types for the inputs are determined by looking at declarations for these inputs within the SUT. If such declarations are lacking then the Simulator infers type information about inputs based on the operations the SUT performs on the inputs. For example, if input x is not declared but has a floating-point operation performed on it, then x is assumed to have a floating-point type.

2. The syntax of the SUT is scanned by the Simulator 8 to determine whether any "interesting values" can be determined for inputs. Interesting values are computed by looking at predicates involving the input variables in the SUT and, when possible, selecting input values that ensure the predicate is both true and false. For example, if the coverage criterion is condition coverage, and the SUT involves a conditional statement containing the condition "x>4", then the set of interesting values for x computed by the disclosed method would be {3,4,5}.

3. If the user supplies a file containing input constraints 5, then these constraints are loaded into an internal data structure maintained by the Simulator 8. These constraints are then combined with "interesting value" information in order to arrive at constraints describing the values that inputs should be constrained to assume.

Figure 3:
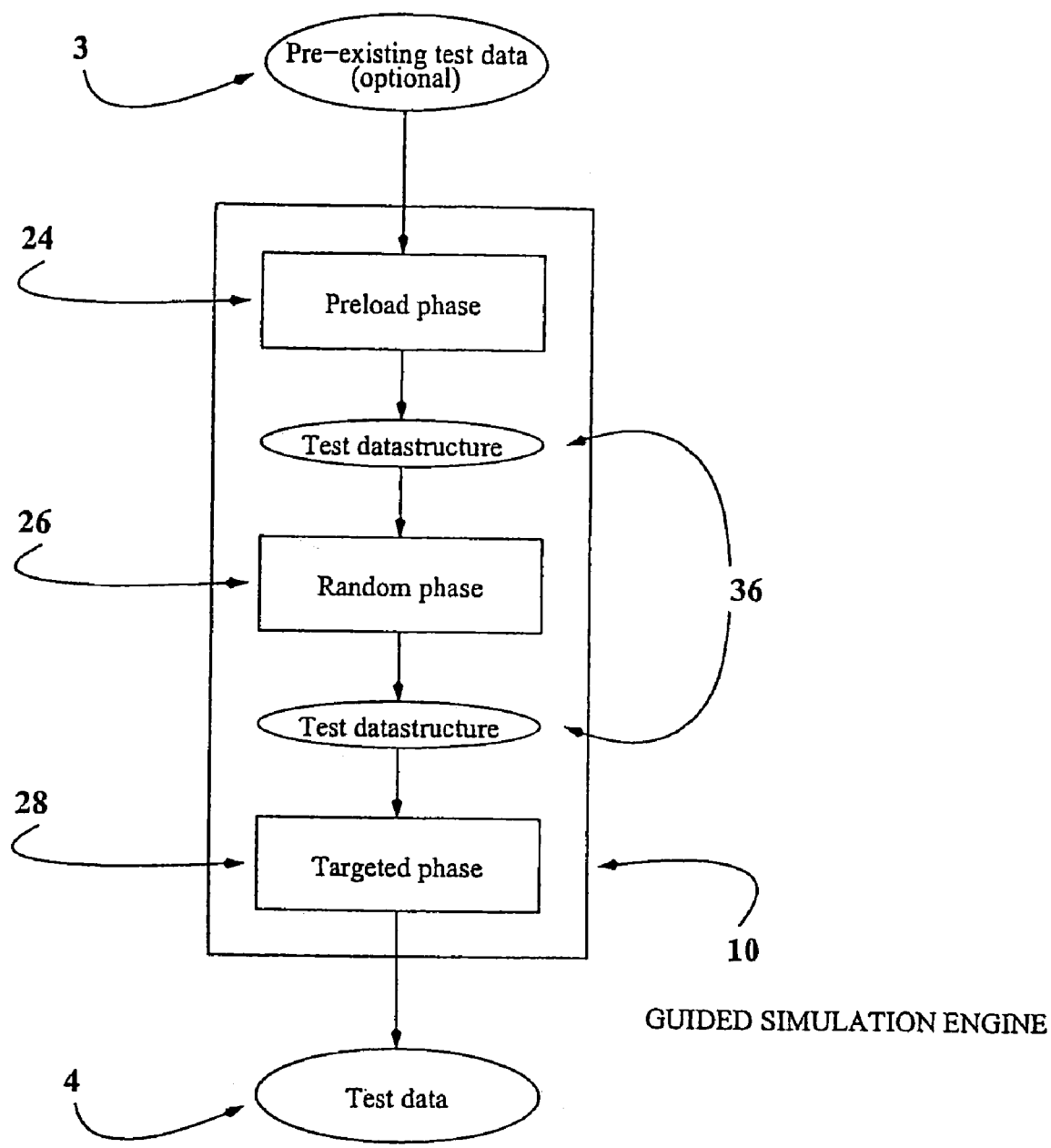
FIG. 3 is a functional overview of the inventions engine.

As depicted in FIG. 3, the Guided-Simulation strategy of the invention involves a three-step process consisting of a preload phase 24, a random phase 26, and a targeted phase 28. These phases are described in more detail below. However, it should be noted that some of the benefits of Guided Simulation can be enjoyed if any of these phases is omitted.

In the preload phase 24, the Guided Simulation Engine 10 loads an (optional, user-provided) file containing a previously constructed test suite 4 and converts this into an internal data structure within the invention 36. The test data is then fed into the Simulator 8, which computes, and stores for later use, coverage information 16 for this preexisting test suite.

In the random phase 26 of Guided Simulation, the test vectors that drive the simulation from one input state to another are generated semi-randomly by the Guided Simulation Engine 10. The Engine 10 feeds these inputs 18 to the Simulator 8, which computes the corresponding simulation steps 20, updates coverage information 16, and feeds outputs 22 generated during the simulation step back to the Engine 10, which adds the input and output information into the test it is currently constructing. The Guided Simulation Engine 10 then repeats this procedure to obtain the next step in the current test. When a user-specified limit on the length of randomly generated tests is reached, the Engine 10 resets the SUT to its initial state 34 and begins building the next test. When a user-specified bound on the number of randomly generated tests is reached, the test-data-generation component of this phase terminates.

The preferred selection procedure used to generate the inputs is as follows. First, the Guided Simulation Engine 10 "flips a coin" to determine whether or not to use the constraint information for inputs that the Simulator maintains. If the decision is to use the constraint information, then the Engine obtains the constraints from the Simulator and randomly selects values for each input that satisfy the constraints. If the decision is to ignore the constraints, then random values from within the type of each input are randomly selected. This procedure ensures that errors in constraints that might degrade test coverage can be avoided. As an example, suppose x is an integer input whose constraint is that its value must fall within the set {3,4,5}. If the Guided Simulation Engine decides to obey this constraint in the current simulation step, then it will randomly assign x one of these three values. If it decides to ignore this constraint in the current simulation step, then it will randomly assign x some integer.

In the final part of the random phase, redundant input vectors are removed from the randomly generated test cases. An input vector is redundant if neither it, nor any subsequent input vector in the same test, causes any new coverage targets to be covered.

Figure 6:
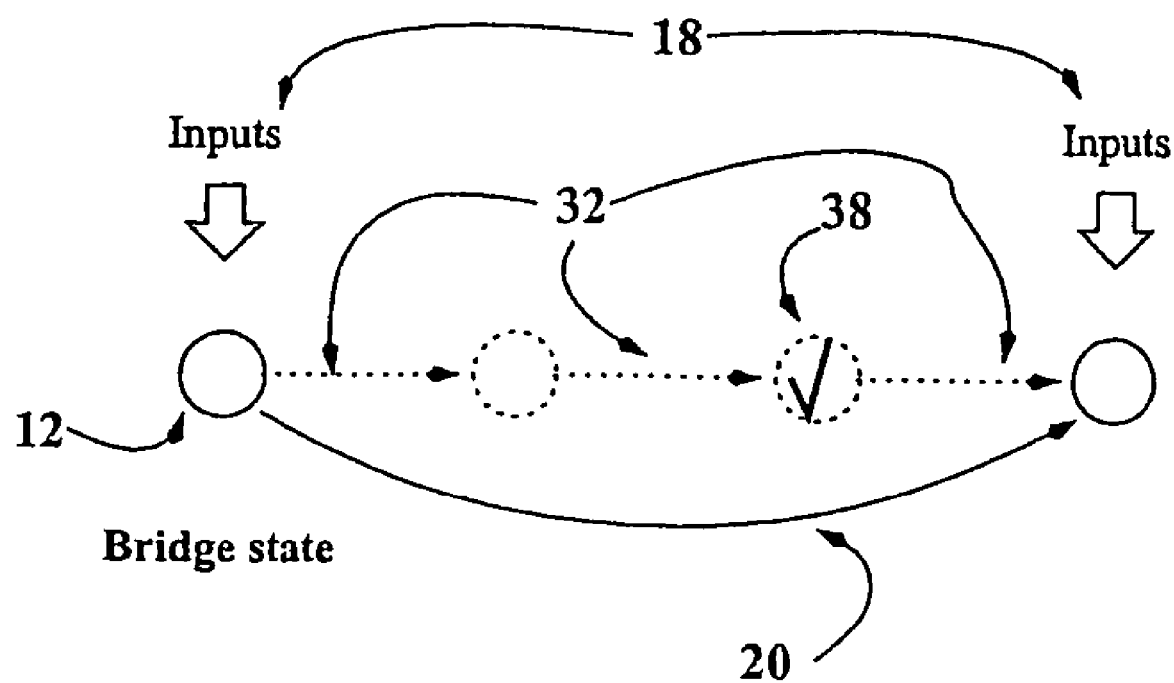
FIG. 6 depicts an example of a bridge state.

The basic idea of the targeted phase of Guided Simulation is to identify bridge states 12: input states 30 that can potentially lead via a single simulation step to the covering of currently uncovered targets 38 (see FIG. 6). By saving bridge states 12 and restarting simulation from them, the probability that progress in meeting the coverage criterion will quickly be made is greatly increased. The process of identifying bridge states 12 and restarting the simulation in a bridge state 12 can be completely automated within the Simulator 8.

Once the SUT is in a bridge state 12, two preferred methods may be used to determine the inputs to be applied in order to reach uncovered targets. The first method uses constraint solving; this method pertains to those targets for which a set of constraints 14 involving input values can be computed and whose solutions guarantee the coverage of said targets. If the constraints are appropriately restricted, then decision procedures can be used to solve them and generate the test vector. As a simple illustration of the use of decision procedures, suppose that a given target appears in the "then" part of an if-then-else statement whose condition is the expression x==y, where x and y are inputs. To satisfy this condition, and thus cover the given target, a decision procedure would generate identical values for x and y. A test vector bearing these values for x and y would guide the simulation from the bridge state in question to the uncovered target in one simulation step.

In the second method to generate test vectors for bridge states 12, probes are launched from a bridge state to see if uncovered targets may become covered. A probe is a bounded sequence of simulation steps 20, each of which corresponds to the application of a randomly generated input vector 18, and each of which either causes a new target to be covered or leaves the SUT in a bridge state. The method used to compute random inputs is the same as the approach described above. If a probe is successful in covering a new target then it is appended to the current test sequence, the newly covered target is recorded, the set of bridge states is recalculated, and another bridge state is selected for probing. If, after a certain number or probes from a bridge state, no new targets are covered then another bridge state is selected, in preferably round-robin fashion, for probing from the original set of bridge states.

The behavior of the probing procedure is controlled by different parameters to the disclosed method, including length of a probe (how many simulation steps should be taken before abandoning the probe?), when probe lengths should be adaptively increased, and when probing from a given bridge state should be terminated and another bridge state considered instead.

In some cases the set of bridge states may be exhausted during the targeted phase. In this case, the method uses random simulation to try to uncover new bridge states.

The targeted phase terminates when the coverage criterion is satisfied or when a user-specified limit on the number of simulation steps taken during the targeted phase is reached.

The present invention was particularly conceived to limit the computer resources required to generate test cases while testing software. This is a particular concern due to the state explosion phenomena. Using a pre-load phase eliminates creating tests from scratch, bridge states eliminates the need to redo steps from the initial state to the bridge state. Therefore computer resources are greatly consumed.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Therefore, it is manifestly intended that this invention be limited only by the claims and the equivalents thereof.

In the detailed description of the preferred embodiments, reference is made to the accompanying drawings, which form a part hereof, and in which is shown by way of illustration, specific embodiments in which the invention may be practiced. It is to be understood that other embodiments may be used, and structural or logical changes may be made, without departing from the scope of the present invention. The detailed description is therefore not to be taken in a limiting sense, and the scope of the present invention is defined by the appended claims.

The invention claimed is:

1. A method for generating tests from a software artifact, each test comprising a sequence of test vectors and each test vector comprising a set of input values for inputs of the software artifact, the method comprising:
   identifying a set of coverage targets in the software artifact to be exercised by the tests;
   executing the software artifact from an initial input state of the software artifact according to a set of initial tests, and correspondingly:
      tracking which coverage targets are exercised during the initial tests;
      saving those sequences of test vectors from the initial tests that exercise at least one of the coverage targets; and
      saving, as a set of bridge states, one or more input states of the software artifact reached by those sequences of test vectors;
   attempting to reach those coverage targets not exercised by the initial tests, based on probing from one or more of the bridge states, rather than from the initial input state of the software artifact, wherein probing from a given bridge state comprises:
      resetting the software artifact to the bridge state;
      generating a probing sequence of test vectors;
      executing the software artifact by applying the probing sequence as inputs to the software artifact until a new input state of the software artifact is reached or until execution terminates; and
      if the probing exercises a coverage target not previously covered, appending the probing sequence of test vectors to the sequence of test vectors associated with reaching the bridge state; and
   saving as said tests the sequences of test vectors from the initial tests that exercised one or more of the coverage targets, along with any probing sequences that were appended during said probing from one or more of the bridge states.

2. The method of claim 1, wherein generating a probing sequence of test vectors comprises solving for constraints over one or more inputs of the software artifact that, if satisfied, will exercise a coverage target not covered by the initial tests, forming one or more test vectors corresponding to those constraints, and stepwise executing the software artifact according to those one or more test vectors applied as inputs to the software artifact.

3. The method of claim 2, wherein probing from the bridge state further comprises, if there are no constraints to solve for, randomly probing from the bridge state by generating one or more random test vectors, and stepwise executing the software artifact according to those one or more random test vectors applied as inputs to the software artifact.

4. The method of claim 3 further comprising loading a constraint file that defines constraints for one or more inputs of the software artifact, and correspondingly constraining the generated values of the randomly generated sequences of test vectors according to the constraint file.

5. The method of claim 1, further comprising recalculating the set of bridge states, in response to exercising a coverage target not covered by the initial tests based on probing from a given bridge state in the set of bridge states.

6. The method of claim 1, wherein saving those sequences of test vectors from the initial tests that exercise at least one of the coverage targets includes eliminating any redundant sequences of test vectors.

7. The method of claim 1, further comprising forming the initial tests at least in part by loading one or more predefined sequences of test vectors from a file.

8. The method of claim 1, further comprising forming the initial tests at least in part by randomly generating one or more sequences of test vectors.

9. The method of claim 8 further comprising loading a constraint file that defines constraints for one or more inputs of the software artifact, and correspondingly constraining the generated values of the randomly generated sequences of test vectors according to the constraint file.

10. The method of claim 1, wherein saving the set of bridge states comprises, for each input state of the software artifact reached during the initial tests, saving the values taken on by variables of the software artifact for that input state.

11. The method of claim 1, wherein saving as test data those sequences of test vectors from the initial tests that exercise at least one of the coverage targets includes saving outputs of the software artifact corresponding to those sequences of test vectors, and wherein saving as said tests comprises saving the test data, including the any appended probing sequences and their corresponding outputs.

* * * * *

UNITED STATES PATENT AND TRADEMARK OFFICE
CERTIFICATE OF CORRECTION

PATENT NO.        : 7,644,398 B2
APPLICATION NO. : 10/499583
DATED             : January 5, 2010
INVENTOR(S)       : Cleaveland et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1043 days.

Signed and Sealed this

Sixteenth Day of November, 2010

David J. Kappos
*Director of the United States Patent and Trademark Office*